(12) United States Patent
Zangenehpour et al.

(10) Patent No.: US 11,948,252 B2
(45) Date of Patent: Apr. 2, 2024

(54) THREE-DIMENSIONAL MESH GENERATOR BASED ON TWO-DIMENSIONAL IMAGE

(71) Applicant: Hinge Health, Inc., San Francisco, CA (US)

(72) Inventors: Sohail Zangenehpour, Beaconsfield (CA); Colin Joseph Brown, Saskatoon (CA); Paul Anthony Kruszewski, Westmount (CA)

(73) Assignee: HINGE HEALTH, INC., San Francisco, CA (US)

( * ) Notice: Subject to any disclaimer, the term of this patent is extended or adjusted under 35 U.S.C. 154(b) by 0 days.

(21) Appl. No.: 18/250,845

(22) PCT Filed: Oct. 29, 2020

(86) PCT No.: PCT/IB2020/060180
§ 371 (c)(1),
(2) Date: Apr. 27, 2023

(87) PCT Pub. No.: WO2022/090775
PCT Pub. Date: May 5, 2022

(65) Prior Publication Data
US 2023/0306686 A1 Sep. 28, 2023

(51) Int. Cl.
*G06T 15/00* (2011.01)
*G06T 7/12* (2017.01)
*G06T 17/20* (2006.01)

(52) U.S. Cl.
CPC ............ *G06T 17/20* (2013.01); *G06T 7/12* (2017.01); *G06T 2207/10024* (2013.01); *G06T 2207/20084* (2013.01); *G06T 2207/30196* (2013.01)

(58) Field of Classification Search
CPC ............ G06T 7/73; G06T 2207/30196; G06T 2207/20084; G06T 2207/20081;
(Continued)

(56) References Cited

U.S. PATENT DOCUMENTS 8,289,318 B1 * 10/2012 Hadap ............... G06T 7/40 382/118
10,813,715 B1 * 10/2020 Chojnowski .......... G06F 3/0304
(Continued)

OTHER PUBLICATIONS

Moon G, Lee KM. l2l-meshnet: Image-to-lixel prediction network for accurate 3d human pose and mesh estimation from a single rgb image. InComputer Vision-ECCV 2020: 16th European Conference, Glasgow, UK, Aug. 23-28, 2020, Proceedings, Part VII 16 2020 (pp. 752-768). Springer International Publishing.*
(Continued)

*Primary Examiner* — Phu K Nguyen
(74) *Attorney, Agent, or Firm* — Perkins Coie LLP

(57) ABSTRACT

An apparatus is provided. The apparatus includes a communications interface to receive raw data from an external source. The raw data includes a representation of an object. Furthermore, the apparatus includes a memory storage unit to store the raw data. The apparatus also includes a preprocessing engine to generate a coarse segmentation map and a joint heatmap from the raw data. The coarse segmentation map is to outline the object and the joint heatmap is to represent a point on the object. The apparatus further includes a neural network engine to receive the raw data, the coarse segmentation map, and the joint heatmap. The neural network engine is to generate a plurality of two-dimensional maps. Also, the apparatus includes a mesh creator engine to generate a three-dimensional mesh based on the plurality of two-dimensional maps.

24 Claims, 17 Drawing Sheets

(58) Field of Classification Search
CPC .... G06T 7/75; G06T 7/50; G06T 3/40; G06N 3/045; G06N 3/084; G06N 3/048
USPC ......................................................... 345/416
See application file for complete search history.

(56) References Cited

U.S. PATENT DOCUMENTS

| | | | | |
|---|---|---|---|---|
| 11,182,924 | B1* | 11/2021 | Akbas | A61B 5/7405 |
| 11,688,139 | B1* | 6/2023 | Karagoz | A61B 5/1128 |
| | | | | 345/419 |
| 2021/0161266 | A1* | 6/2021 | Brown | G06V 10/34 |
| | | | | D2/857 |
| 2021/0392296 | A1* | 12/2021 | Rabinovich | G06T 7/70 |
| 2022/0148296 | A1* | 5/2022 | Brown | G06N 3/044 |
| 2023/0096013 | A1* | 3/2023 | Agrawal | G06T 7/60 |
| | | | | 345/423 |
| 2023/0225832 | A1* | 7/2023 | Cramer | A61C 7/08 |
| | | | | 433/2 |

OTHER PUBLICATIONS

Kim Y, Kim D. A CNN-based 3D human pose estimation based on projection of depth and ridge data. Pattern Recognition. Oct. 1, 2020;106:107462.*

Yang L, Li J, Xu W, Diao Y, Lu C. Bihand: Recovering hand mesh with multi-stage bisected hourglass networks. arXiv preprint arXiv:2008.05079. Aug. 12, 2020.*

Kniaz VV, Knyaz VA, Mizginov V, Kozyrev M, Moshkantsev P. StructureFromGAN: single image 3D model reconstruction and photorealistic texturing. InEuropean Conference on Computer Vision Aug. 23, 2020 (pp. 595-611). Cham: Springer International Publishing.*

Kato H, Ushiku Y, Harada T. Neural 3d mesh renderer. InProceedings of the IEEE conference on computer vision and pattern recognition 2018 (pp. 3907-3916).*

Pavlakos, et al., "Learning to Estimate 3D Human Pose and Shape from a Single Color Image", Proceedings of 2018 IEEE/CVF Conference on Computer Vision and Pattern Recognition, retrieved online from url: <https://ieeexplore.ieee.org/stamp/stamp.jsp?tp=&amumber=8578153>, also available at <https://openaccess.thecvf.com/content_cvpr_2018/papers/Pavlakos_Ordinal_Depth_Supervision_CVPR_2018_paper.pdf>, Jun. 18, 2021, pp. 459-468.

Tang, et al., "A Neural Network for Detailed Human Depth Estimation From a Single Image", Proceedings of 2019 IEEE/CVF International Conference on Computer Vision (ICCV), retrieved online from url: <https://ieeexplore.ieee.org/stamp/stamp.jsp?tp=&arnumber=9008269 >, also available at <https://openaccess.thecvf.com/content_ICCV_2019/papers/Tang_A_Neural_Network_for_Detailed_Human_Depth_Estimation_From_a_ICCV_2019_paper.pdf> Oct. 27, 2019, pp. 7749-7758.

Varol, et al., "BodyNet: Volumetric Inference of 3D Human Body Shapes", Proceedings of the 15th European Conference on Computer Vision—ECCV 2018; retrieved online from url: <http://www.ecva.net/papers/eccv_2018/papers_ECCV/papers/Gui_Varol_BodyNet_Volumetric_Inference_ECCV_2018_paper.pdf>, Sep. 8-14, 2018, pp. 1-17.

Zhou, et al., "Learning to Reconstruct 3D Manhattan Wireframes from a Single Image", Proceedings of 2019 IEEE/CVF International Conference on Computer Vision (ICCV), retrieved online from url: <https://ieeexplore.ieee.org/stamp/stamp.jsp?tp=&arnumber=9010693 >, Oct. 17, 2019, pp. 7697-7706.

Natsume, Ryota, et al., "SiCloPe: Silhouette-Based Clothed People", 2019 IEEE/CVF Conference On Computer Vision and Pattern Recognition (CVPR), IEEE, XP033687199, Jun. 15, 2019, pp. 4475-4485.

* cited by examiner

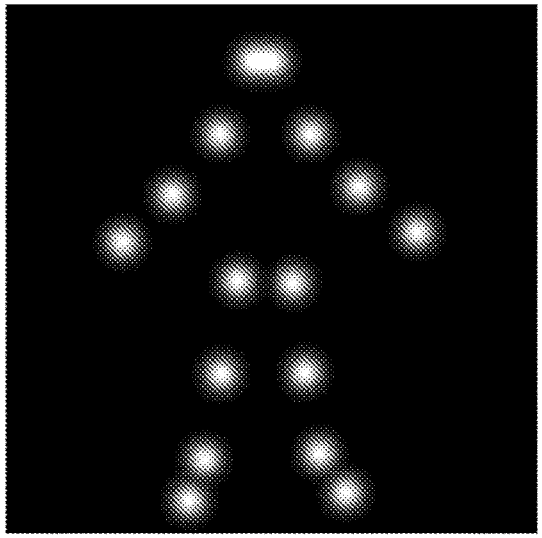
Fig. 6
Fig. 7
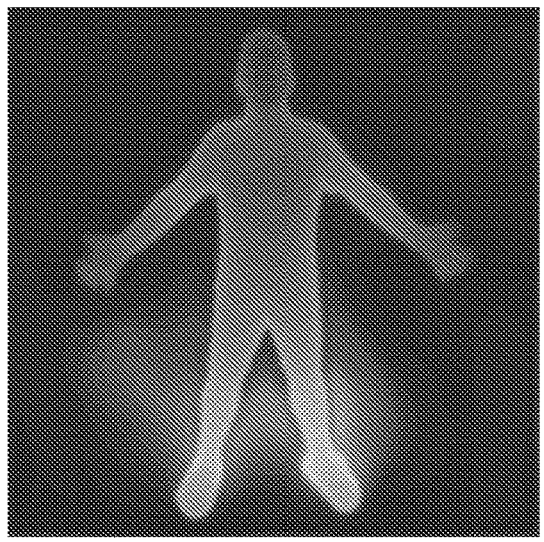
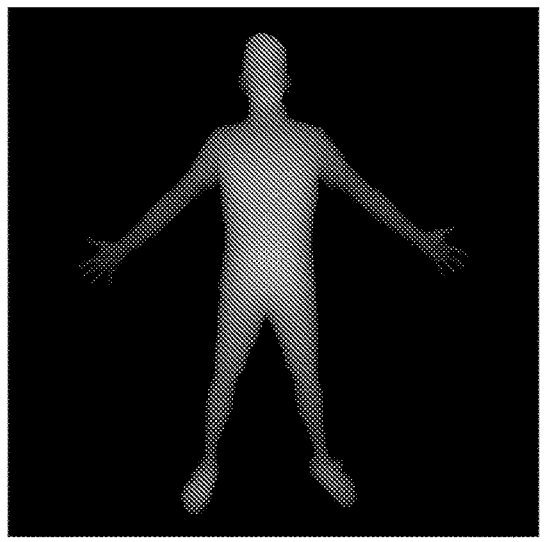
Fig. 8A
Fig. 8B

THREE-DIMENSIONAL MESH GENERATOR BASED ON TWO-DIMENSIONAL IMAGE

CROSS-REFERENCE TO RELATED APPLICATION

This application is a national stage entry of International Patent Application No. PCT/162020/060180, filed on Oct. 29, 2020, and titled "THREE-DIMENSIONAL MESH GENERATOR BASED ON TWO-DIMENSIONAL IMAGE," which is incorporated by reference herein in its entirety.

BACKGROUND

Computer animation may be used in various applications such as computer-generated imagery in the film, video games, entertainment, biomechanics, training videos, sports simulators, and other arts. Animations of people or other objects may involve the generation of a three-dimensional mesh which may be manipulated by the computer animation system to carry out various motions in three-dimension. The motions may be viewed by a user or audience from a single angle, or from multiple angles.

The objects to be animated in a computer animation are typically pre-programmed into the system. For example, an artist or illustrator may develop a general appearance of the object to be animate. In some examples, multiple appearances may be created for an object, such as people having different faces or body types. In designing these additional avatars, a programmer or graphics designer may typically generate a mesh for each avatar individually. In some examples, scans of real-life objects may also be taken from multiple angles and stitched together to form a three-dimensional mesh.

BRIEF DESCRIPTION OF THE DRAWINGS

Reference will now be made, by way of example only, to the accompanying drawings in which:

FIG. 6 is a representation of the joint heatmaps shown in FIGS. 5A to 5Q superimposed on a single image;

FIG. 7 is a fine segmentation map of the image of FIG. 2;

FIG. 8A is a two-dimensional distance map of the front surface as generated by the neural network engine;

FIG. 8B is a two-dimensional thickness map of the front surface as generated by the neural network engine;

DETAILED DESCRIPTION

Figure 1:
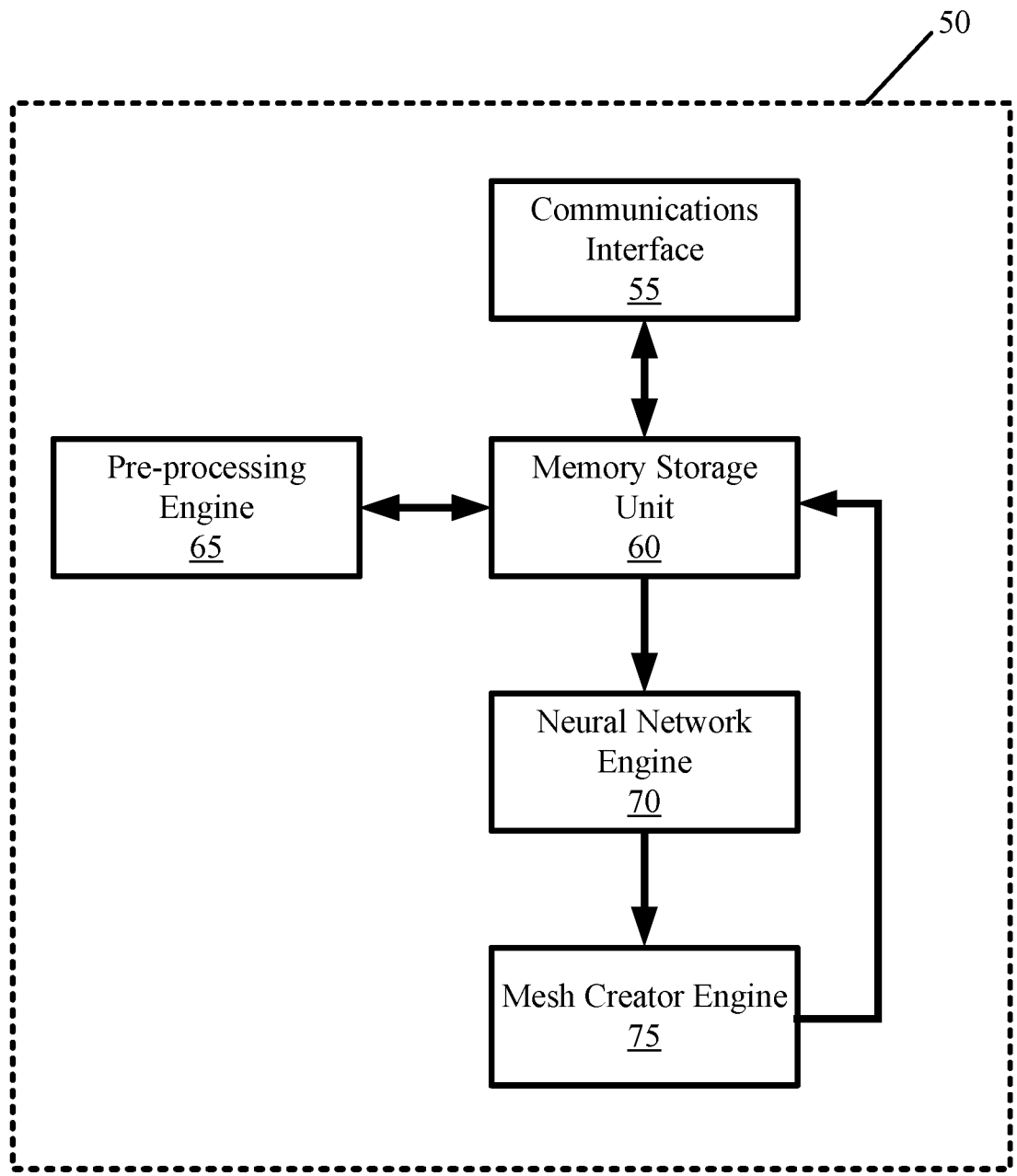
FIG. 1 is a schematic representation of the components of an example apparatus to generate a three-dimensional mesh based on a single two-dimensional image.

As used herein, any usage of terms that suggest an absolute orientation (e.g. "top", "bottom", "up", "down", "left", "right", "low", "high", etc.) may be for illustrative convenience and refer to the orientation shown in a particular figure. However, such terms are not to be construed in a limiting sense as it is contemplated that various components will, in practice, be utilized in orientations that are the same as, or different than those described or shown.

Computer animation is used in a broad range of different sectors to provide motion to various objects, such as people. In many examples of computer animation, a three-dimensional representation of an object is created with various characteristics. The characteristics are not particularly limited and may be dependent on the object as well as the expected motions and range of motions that the object may have. For example, if the object is a car, the car may be expected to have a standard shape such as a sedan with doors that open and wheels that can spin and front wheels that may be turned within a predetermined range of angles.

In other examples where the object is a person, the person will have various joints with different ranges of motions. It is to be appreciated by a person of skill in the art with the benefit of this description that the term "joint" refers to various reference points in a person that may be modeled with a range of motion to represent an approximation of the reference point on a person. For example, a joint may refer to a reference point on a person that is not a physiological joint, such as an eye. In other examples, a joint may refer to a reference point with multiple physiological bone joints, such as a wrist or ankle.

Accordingly, objects to be animated may generally be represented by a pre-programmed mesh with the relevant characteristics, such as the location and the range of motion at each joint. The position as well as the available range of motion at each joint will provide the object with the appearance of natural movement. In addition, the mesh may have additional features such as textures and colors added thereon to provide a better appearance of the object. For example, a three-dimensional mesh of a person may be generated with joints representing physiological joints to mimic the natural movements of a person. Color may be added to the mesh to match skin color and/or clothes and texture may also be added to provide the appearance of a real person. The mesh may then be animated for various purposes such as those described above.

An apparatus and method of generating a three-dimensional mesh based on a single two-dimensional image is provided. The apparatus may receive an image representing an object and then derive a complete three-dimensional mesh including inferring the back of the object that is not visible in the input image. The generation of the back of the object is carried out by a neural network that has been trained with synthetic data to approximate the back surface based on various input parameters that will be described in detail below. By providing a means to generate a three-dimensional mesh from a single two-dimensional image, life-like avatars may be created without manually generating the avatar by a designer or programmer. Furthermore, the use of a single two-dimensional image further facilitates the process compare with other methods which may use multiple scans from multiple angles to interpolate the three-dimensional mesh, color and texture.

In the present description, the models and techniques discussed below are generally applied to a person. It is to be appreciated by a person of skill with the benefit of this description that the examples described below may be applied to other objects as well such as animals and machines.

Referring to FIG. 1, a schematic representation of an apparatus to generate a three-dimensional mesh based on a single two-dimensional image is generally shown at 50. The apparatus 50 may include additional components, such as various additional interfaces and/or input/output devices such as indicators to interact with a user of the apparatus 50. The interactions may include viewing the operational status of the apparatus 50 or the system in which the apparatus 50 operates, updating parameters of the apparatus 50, or resetting the apparatus 50. In the present example, the apparatus 50 is to receive raw data, such as a standard RGB image, and to process the raw data to generate a three-dimensional mesh. In the present example, the apparatus 50 includes a communications interface 55, a memory storage unit 60, a pre-processing engine 65, a neural network engine 70, and a mesh creator engine 75.

The communications interface 55 is to communicate with an external source to receive raw data representing an object. In the present example, the communications interface 55 may communicate with external source over a network, which may be a public network shared with a large number of connected devices, such as a WiFi network or cellular network. In other examples, the communications interface 55 may receive data from an external source via a private network, such as an intranet or a wired connection with other devices. As another example, the communications interface 55 may connect to another proximate device via a Bluetooth connection, radio signals, or infrared signals. In particular, the communications interface 55 is to receive raw data from the external source to be stored on the memory storage unit 60.

In the present example, the raw data may be a two-dimensional image of the object. The manner by which the object is represented and the exact format of the two-dimensional image is not particularly limited. In the present example, the two-dimensional image is received in an RGB format. It is to be appreciated by a person of skill in the art with the benefit of this description that the RGB format is an additive color model where the color image is represented by three values, each of the values representing the intensity of a red color, a green color, or a blue color. Accordingly, the two-dimensional images may be represented by three separate maps. In other examples, the two-dimensional image be in a different format, such as a raster graphic file or a compressed image file captured and processed by a camera.

Furthermore, the communications interface 55 may be used to transmit result, such as the three-dimensional mesh that is generated. For example, the communications interface 55 may be in communication with an animation engine (not shown) which may be part of the apparatus 50 or on a separate device. Accordingly, the apparatus 50 may operate to receive raw data from an external source to generate a three-dimensional object having joints and surface color and texture to be transmitted either back to the external source for additional processing and/or rendering, or to an additional device for additional processing and/or rendering. Accordingly, the apparatus 50 may operate as a service for computer animators who may want to create a new avatar in the likeliness of an individual in a photograph.

The memory storage unit 60 is to store data received via the communications interface 55. In particular, the memory storage unit 60 may store raw data including two-dimensional images representing objects for which a three-dimensional mesh and surface data is to be generated. In the present example, the memory storage unit 60 may be store multiple two-dimensional images representing different objects in two-dimensions for three-dimensional animation purposes. In particular, the objects may be images of people having different sizes and may include the people in different poses showing different joints. For example, the image may be of a person in an A-pose clearly shown multiple and substantially symmetrical joints. In other examples, the person may be in a standard T-pose position. In further examples, the person in the raw data may be in a natural pose with one or more joints obstructed from view. Although the present examples each relate to a two-dimensional image of a person, it is to be appreciated with the benefit of this description that the examples may also include images that represent different types of objects, such as an animal or machine.

The memory storage unit 60 may be also used to store addition data to be used by the apparatus 50. For example, the memory storage unit 60 may store various reference data sources, such as templates and model data. It is to be appreciated that the memory storage unit 60 may be a physical computer readable medium used to maintain multiple databases, or may include multiple mediums that may be distributed across one or more external servers, such as in a central server or a cloud server.

In the present example, the memory storage unit 60 is not particularly limited includes a non-transitory machine-readable storage medium that may be any electronic, magnetic, optical, or other physical storage device. The memory storage unit 60 may be used to store information such as data received from external sources via the communications interface 55, template data, training data, pre-processed data from the pre-processing engine 65, results from the neural network engine 70, or results from the mesh creator engine 75. In addition, the memory storage unit 60 may be used to store instructions for general operation of the apparatus 50. Furthermore, the memory storage unit 60 may store an operating system that is executable by a processor to provide general functionality to the apparatus 50 such as functionality to support various applications. The memory storage unit 60 may additionally store instructions to operate the pre-processing engine 65 and the neural network engine 70, or the mesh creator engine 75. Furthermore, the memory storage unit 60 may also store control instructions to operate other components and any peripheral devices that may be installed with the apparatus 50, such as cameras and user interfaces.

The memory storage unit 60 may be preloaded with data, such as training data or instructions to operate components of the apparatus 50. In other examples, the instructions may be loaded via the communications interface 55 or by directly transferring the instructions from a portable memory storage device connected to the apparatus 50, such as a memory flash drive. In other examples, the memory storage unit 60 may be an external unit such as an external hard drive, or a cloud service providing content.

The pre-processing engine 65 is to pre-process the raw data from the memory storage unit 60 to generate a coarse segmentation map and a two-dimensional joint heatmap. In the present example, the raw data may include a color image of an object. It is to be appreciated by a person of skill in the art that the format of the raw data is not particularly limited. To illustrate the operation of the pre-processing engine 65, the raw data may be rendered to provide the color image (shown in grayscale in FIG. 2). In this specific example, the object of the raw data represents a photograph of a person in the A-pose. Furthermore, the raw data in this specific example is an RGB image which may be represented as three superimposed maps for the intensity of red color, green color, and blue color. The maps may include a value for each pixel, such as a normalized value between 0 and 1 to represent the intensity of the color. Continuing with the present example, the color image shown in FIG. 2 may be represented by a red map (FIG. 3A), a green map (FIG. 3B), and a blue map (FIG. 3C), where the darker shades of grayscale represent less intense amounts of the respective color. In other examples where the raw data may not be in RGB image format, the raw data may be converted to RGB format prior to being received by the pre-processing engine 65. Alternatively, the pre-processing engine 65 may be configured to receive and handle additional type of image formats.

Figure 2:
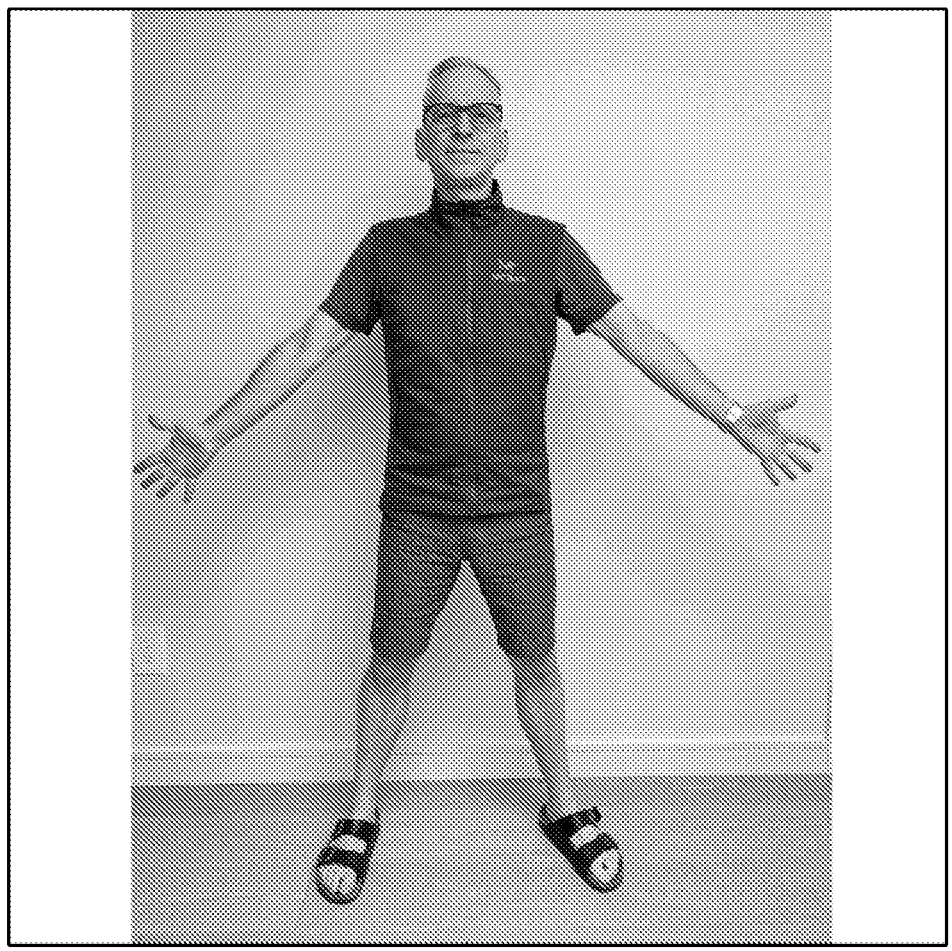
FIG. 2 is an example of raw data representing an image received at the apparatus of FIG. 1.
Figure 3A:
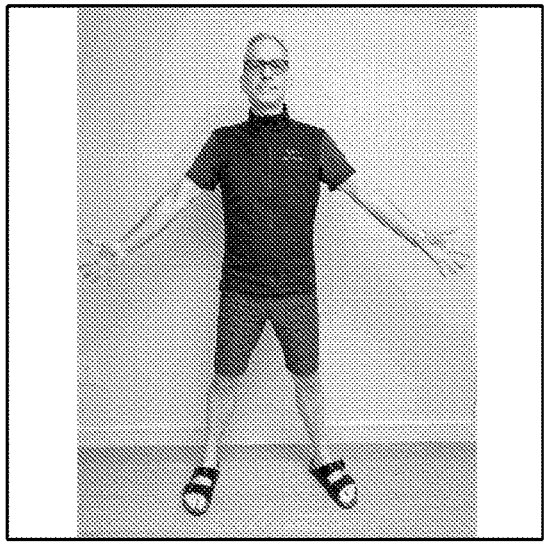
FIG. 3A is a map of the intensity of the red colors in the image of FIG. 2.
Figure 3B:
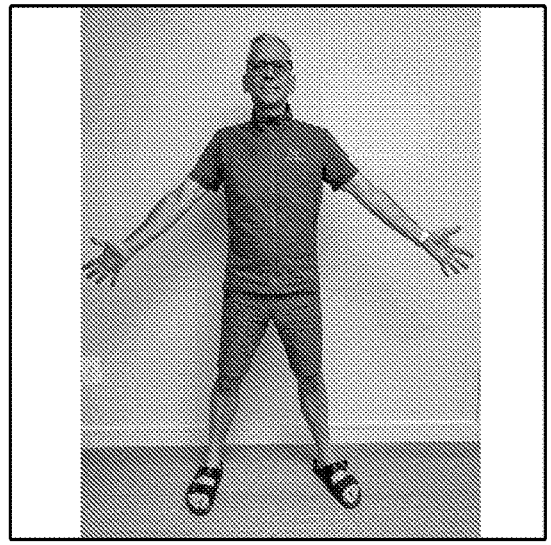
FIG. 3B is a map of the intensity of the green colors in the image of FIG. 2.
Figure 3C:
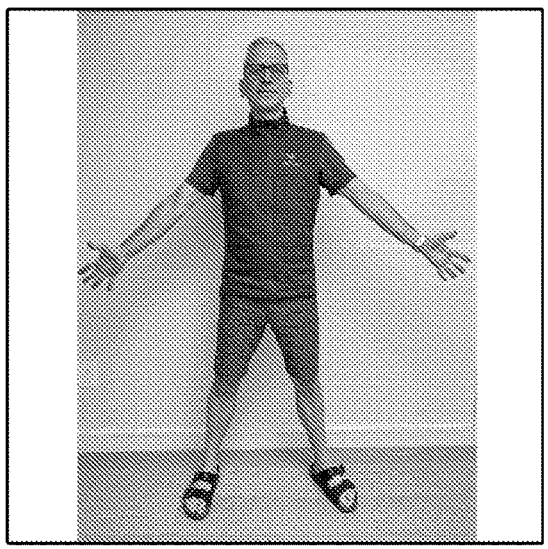
FIG. 3C is a map of the intensity of the blue colors in the image of FIG. 2.
Figure 4:
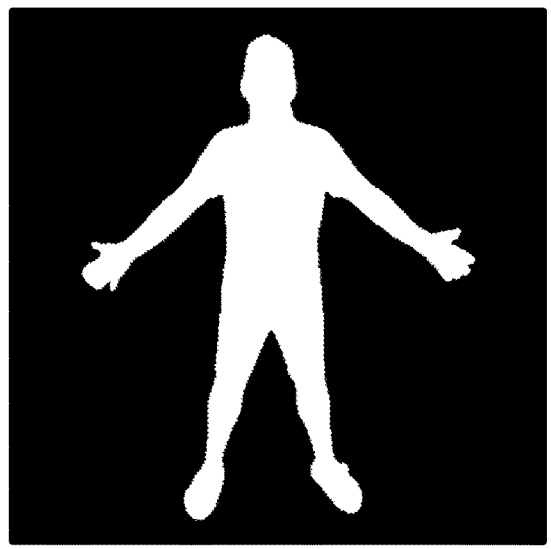
FIG. 4 is a coarse segmentation map of the image of FIG. 2.

The coarse segmentation map generated by the pre-processing engine 65 is to generally provide an outline of the object. In the present example, the coarse segmentation map is a two-dimensional map. Referring to FIG. 4, an example of a coarse segmentation map of the image shown in FIG. 2 is shown. The coarse segmentation map includes a binary value for each pixel to indicate whether the pixel is part of the object. Accordingly, the coarse segmentation map shows a similar shape as the person in the original image in the A-pose. It is to be appreciated by a person of skill with the benefit of this description that the coarse segmentation map may be used to isolate the pixels of interest for further analysis, such as by the neural network engine 70.

The generation of the coarse segmentation map is not particularly limited and may involve various image processing engines or user input. In the present example, a computer vision-based human pose and segmentation system such as the wrnchAI engine is used. In other examples, other types of computer vision-based human segmentation systems may be used such as OpenPose, Mask-R CNN, or other depth sensor, stereo camera or LIDAR-based human segmentation systems such as Microsoft Kinect or Intel RealSense. In addition, the segmentation map may be annotated by hand with an appropriate software such as CVAT or in a semi-automated way with segmentation assistance tools such as those in Adobe Photoshop or GIMP.

The joint heatmap generated by the pre-processing engine 65 is to generally provide representation of the location of a point on the object. In the present example, the joint heatmap is a two-dimensional map. The point of interest on the object is a joint which may correspond to a location where the object carries out relative motions between portions of the object. Continuing with the present example of a person as the object, a joint may represent a joint on the person, such as a shoulder where an arm moves relative to the torso. The joint heatmap includes a confidence value for each pixel to indicate likelihood of whether the pixel is where the joint of interest is located. Accordingly, the joint heatmap typically shows a single hotspot where the pre-processing engine 65 has determined the joint of interest to be located. It is to be appreciated that in some examples, the pre-processing engine 65 may be part of an external system providing pre-processed data or the pre-processed data may be generated by other methods, such as manually by a user.

It is to be appreciated by a person of skill with the benefit of this description that an object may have more than one joint heatmap. In particular, a separate joint heatmaps may be generated for a plurality of pre-defined joints. In the specific example of a person, multiple joints may be pre-defined representing points where a person may have relative motion. It is to be further understood that for each joint, a certain range of motion or characteristics about the joint may be approximated. For example, a shoulder joint may have a predetermined range of motion and degree of freedom to approximate the motion about a human shoulder and an elbow may have more limited degrees of freedom similar to the difference between a shoulder and elbow of a person. In the present example, it is also to be understood by a person of skill with the benefit of this description that more predetermined joints identified for an object allows for a more accurate and realistic depiction of the person.

Figure 5A:
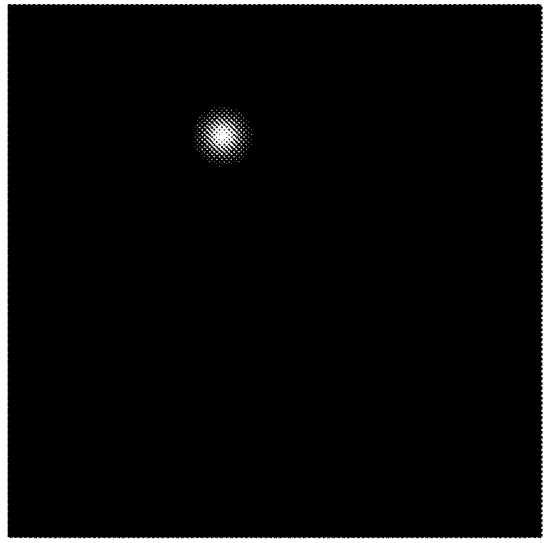
FIG. 5A is a joint heatmap of the right shoulder joint of the person in the image of FIG. 2.
Figure 5B:
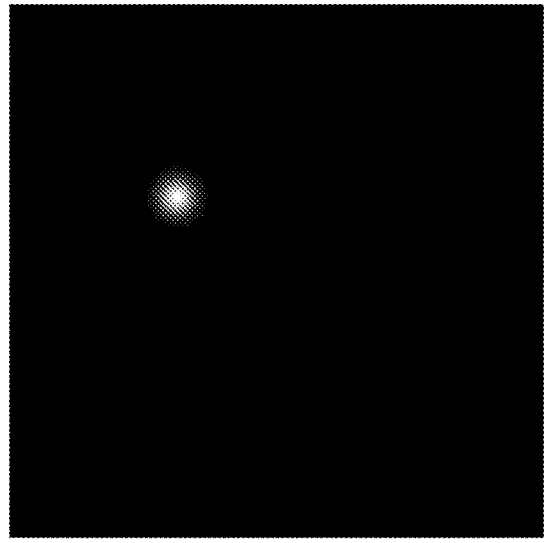
FIG. 5B is a joint heatmap of the right elbow joint of the person in the image of FIG. 2.
Figure 5C:
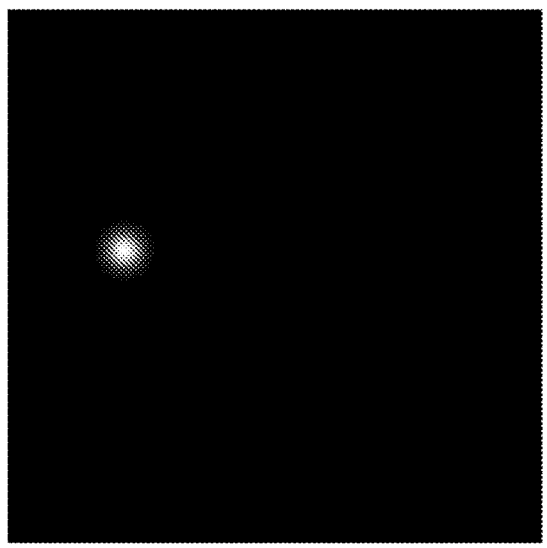
FIG. 5C is a joint heatmap of the right wrist joint of the person in the image of FIG. 2.
Figure 5D:
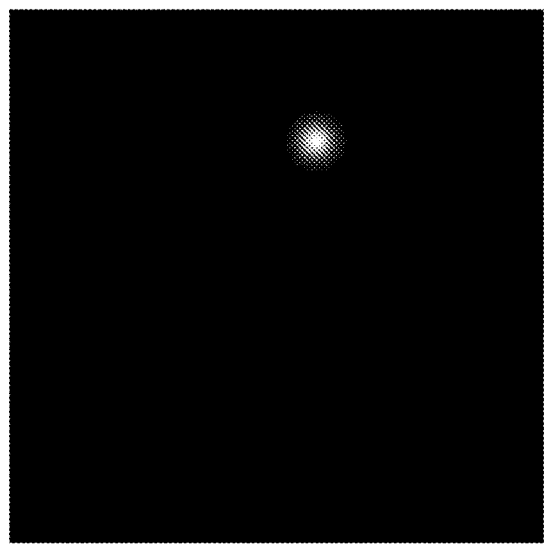
FIG. 5D is a joint heatmap of the left shoulder joint of the person in the image of FIG. 2.
Figure 5E:
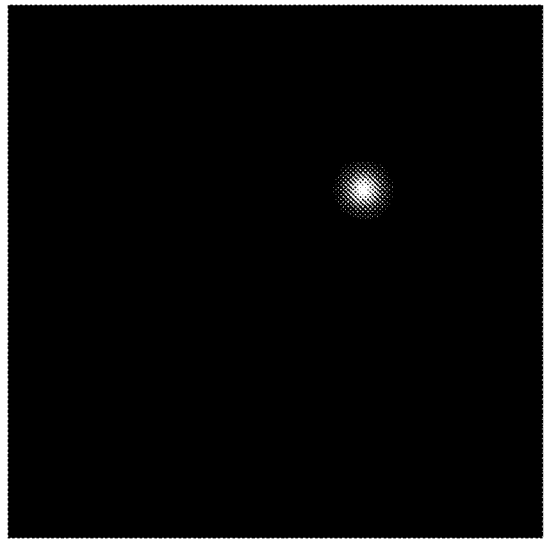
FIG. 5E is a joint heatmap of the left elbow joint of the person in the image of FIG. 2.
Figure 5F:
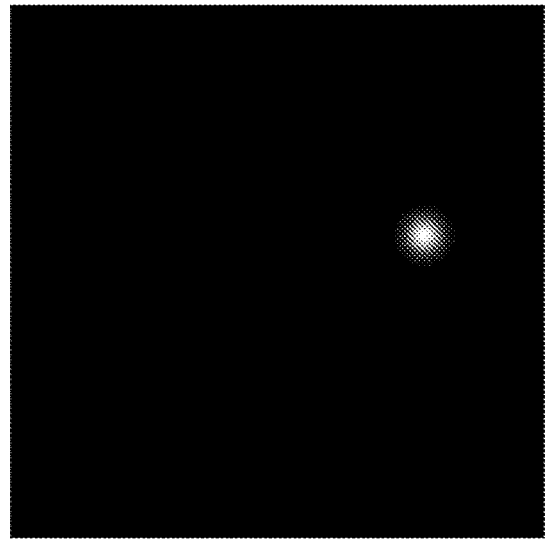
FIG. 5F is a joint heatmap of the left wrist joint of the person in the image of FIG. 2.
Figure 5G:
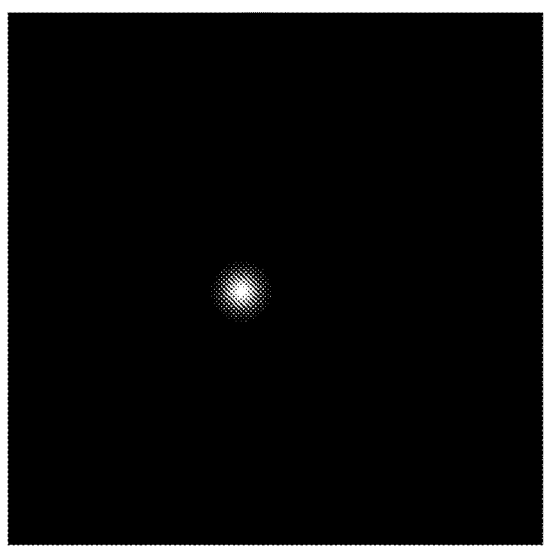
FIG. 5G is a joint heatmap of the right hip joint of the person in the image of FIG. 2.
Figure 5H:
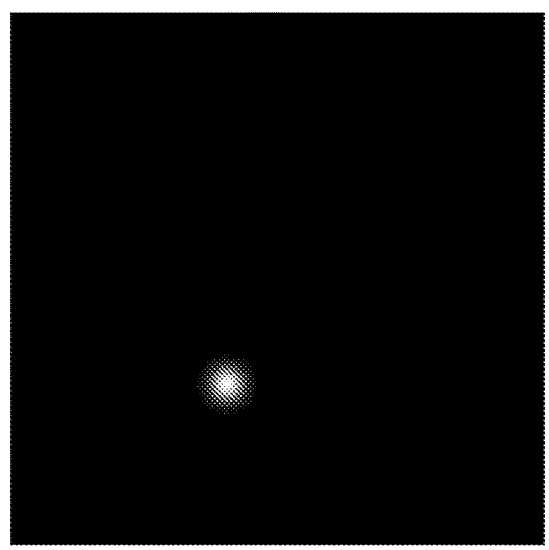
FIG. 5H is a joint heatmap of the right knee joint of the person in the image of FIG. 2.
Figure 5I:
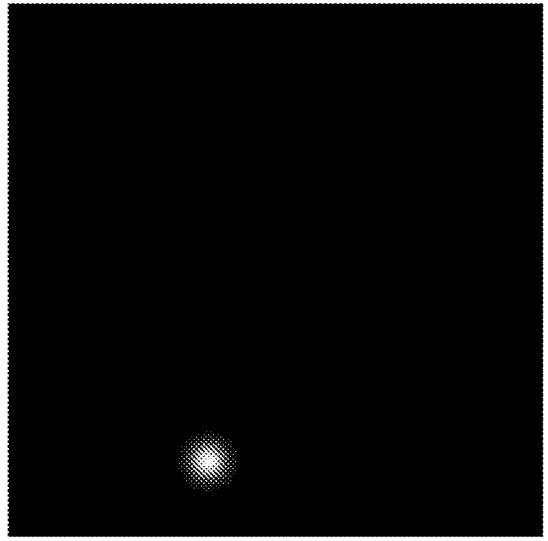
FIG. 5I is a joint heatmap of the right ankle joint of the person in the image of FIG. 2.
Figure 5J:
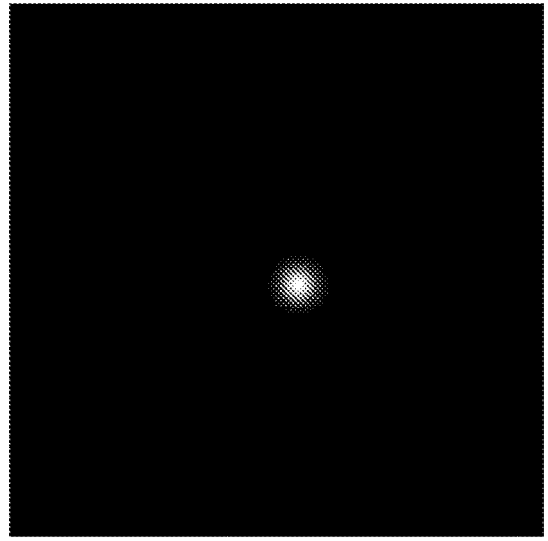
FIG. 5J is a joint heatmap of the left hip joint of the person in the image of FIG. 2.
Figure 5K:
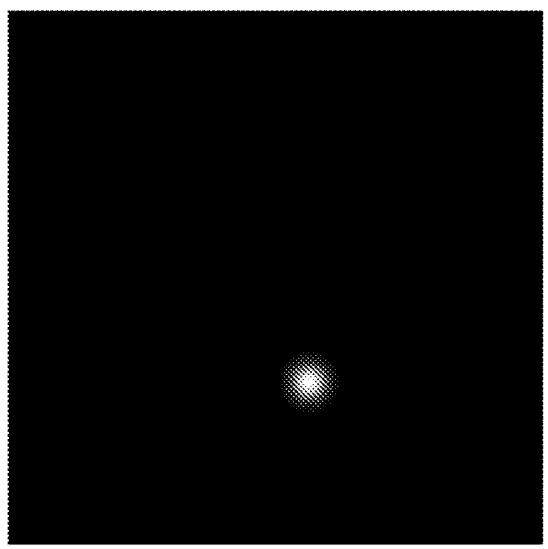
FIG. 5K is a joint heatmap of the left knee joint of the person in the image of FIG. 2.
Figure 5L:
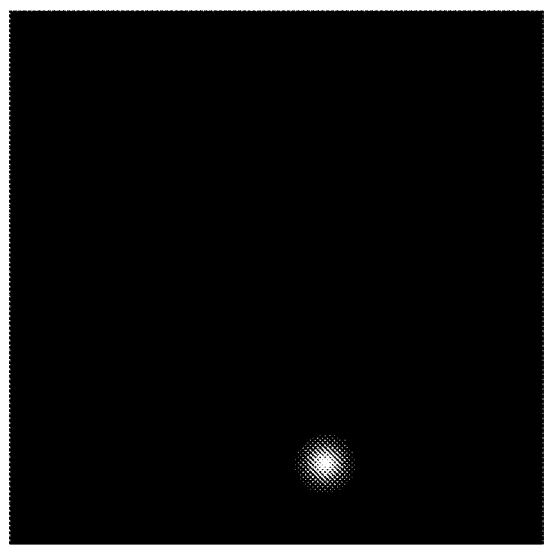
FIG. 5L is a joint heatmap of the left ankle joint of the person in the image of FIG. 2.
Figure 5M:
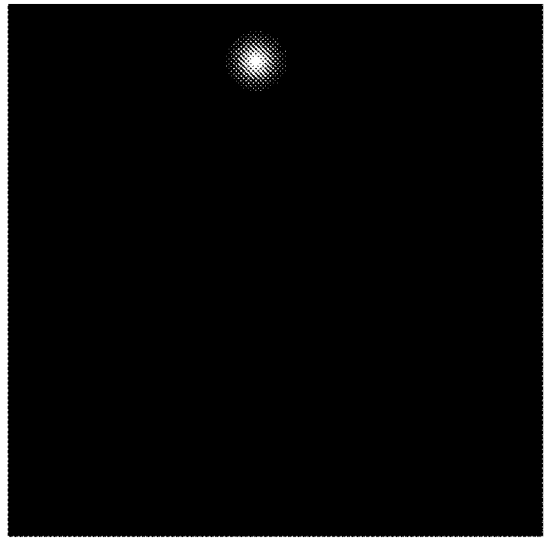
FIG. 5M is a joint heatmap of the right eye of the person in the image of FIG. 2.
Figure 5N:
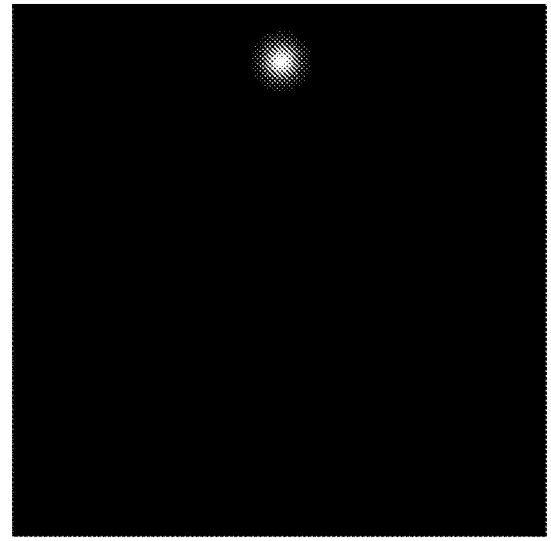
FIG. 5N is a joint heatmap of the left eye of the person in the image of FIG. 2.
Figure 5P:
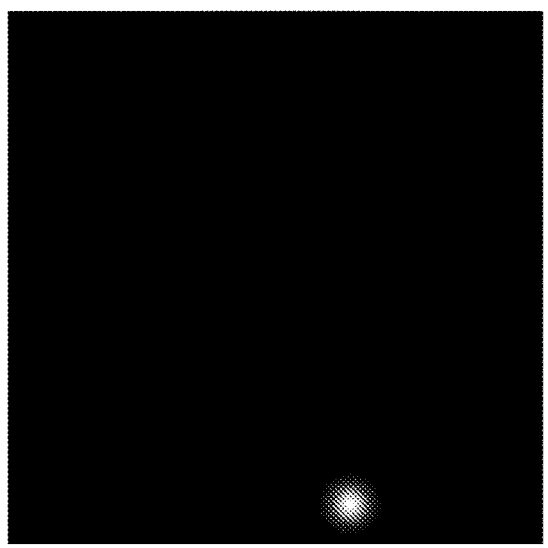
FIG. 5P is a joint heatmap of the left toe of the person in the image of FIG. 2.
Figure 5Q:
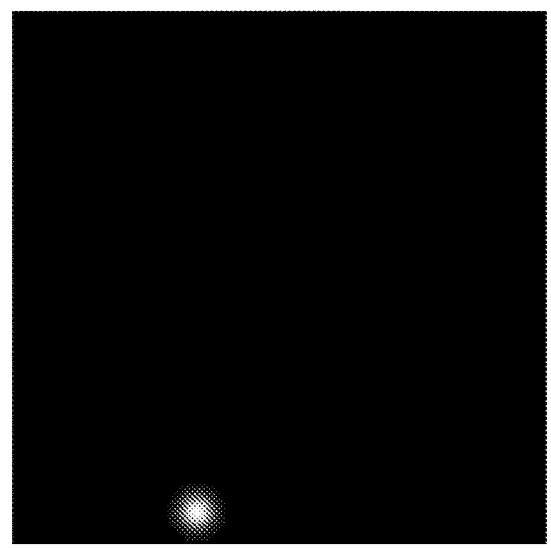
FIG. 5Q is a joint heatmap of the right toe of the person in the image of FIG. 2.

In the present specific example, the pre-processing engine 65 is configured to identify and locate sixteen joints on a person. In particular, the pre-processing engine 65 is to identify a left eye, a right eye, a left shoulder, a right shoulder, a left elbow, a right elbow, a left wrist, a right wrist, a left hip, a right hip, a left knee, a right knee, a left ankle, a right ankle, a left toe, and a right toe. Referring back to the raw data image shown in FIG. 2, the pre-processing engine 65 generates the joint heatmaps for the right shoulder (FIG. 5A), the right elbow (FIG. 5B), the right wrist (FIG. 5C), the left shoulder (FIG. 5D), the left elbow (FIG. 5E), the left wrist (FIG. 5F), the right hip (FIG. 5G), the right knee (FIG. 5H), the right ankle (figure SI), the left hip (FIG. 5J), the left knee (FIG. 5K), the left ankle (FIG. 5L), the right eye (FIG. 5M), the left eye (FIG. 5N), the left toe (FIG. 5P), and the right toe (FIG. 5Q). By superimposing FIGS. 5A-5Q, the joints of the person shown in original FIG. 2 can be viewed in FIG. 6. It is to be appreciated that each of the joint heatmaps is to be used by the neural network engine 70 and that the representation shown in FIG. 6 is for viewing and comparison purposes by a user.

The generation of the joint heatmap is not particularly limited and may involve various image processing engines. In the present example, a computer vision-based human pose system such as the wrnchAI engine is used to identify each joint and to assign a confidence value to the location of the joint in the raw data. In other examples, other types of human pose systems may be used such as OpenPose, Google Blaze Pose, Mask-R CNN, or other depth sensor, stereo camera or LIDAR-based human pose systems such as Microsoft Kinect or Intel RealSense. In further examples, the human pose may alternately be annotated by hand in an appropriate key-point annotation tool such as Keymakr.

In the present example, the coarse segmentation map and the joint heatmap generated by the pre-processing engine 65 is stored in the memory storage unit 60 for subsequent use by the neural network engine 70. In other examples, the coarse segmentation map and the joint heatmap generated by the pre-processing engine 65 may be fed directly into the neural network engine 70 for subsequent processing.

The neural network engine 70 receives the raw data from the memory storage unit 60 and the coarse segmentation map and the joint heatmap generated by the pre-processing engine 65. In the present example, the neural network engine 70 may access the memory storage unit 60 to retrieve the inputs to generate a plurality of two-dimensional maps. The amount of inputs received by the neural network engine 70 is not particularly limited and may include more or less inputs than described in the example below. The two-dimensional maps generated by the neural network engine 70 is not particularly limited. For example, the two-dimensional maps may include maps of other characteristics. Furthermore, it is to be appreciated by a person of skill with the benefit of this description that not all two-dimensional maps may be used by the mesh creator engine 75 and that some two-dimensional maps are to be used for to improve training the neural network engine 70 as well as improved the accuracy of the prediction.

The manner by which the two-dimensional maps are generated is not particularly limited. In the present example, the neural network engine 70 is to apply a fully convolutional neural network to the plurality of inputs to generate the plurality of two-dimensional maps. In particular, the neural network engine 70 uses an architecture with a two stacked U-net with intermediate supervision. In other examples, the neural network engine 70 may have a different architecture, such as a single U-net, hourglass or stacked hourglass.

In the present example, the neural network engine 70 is to be trained using synthetic data. The source of the synthetic data is not particularly limited. In the present example, the synthetic data may be generated using a synthetic data generator, such as one provided by the Unity platform, with rigged human mesh data from RenderPeople, animations from Adobe Mixamo and realistic HDRI backgrounds from HDRI Haven. In other examples, the synthetic data may be rendered in Maya, Unreal Engine, Blender or other 3D rendering platform, with body-scanned human mesh data sourced from the CAESAR dataset or online sources such as TurboSquid, or generated manually by collecting images with known measurements. In the present example, the training data includes 580 rigged characters, 220 HDRI backgrounds, and 1200 animations. A character is randomly selected and place in front of randomly selected and randomly rotated HDRI background. A random animation is applied to the character and a screenshot is taken. This process is carried out to generate about 50,000 images to train this neural network. In other examples, more or less images may also be used.

Furthermore, the training data used to train the neural network engine 70 may be noisy, such as with the addition of random noise to further improve results, even if the results of the pre-processing engine 65 are less accurate. In particular, the augmentation and addition of the noise is to reduce the likelihood of the neural network over-fitting to the synthetic data and to be robust to smaller inaccuracies of coarse segmentation and joint locations. The augmentation and addition of noise is not particularly limited. For example, the RGB image may modified using a Gaussian blur, a motion blur, an additive Gaussian noise, JPEG compression, contrast and brightness normalization, addition of salt and pepper noise, and scaling and translation. The segmentation of the training data may also include scaling and translation, and erosion/dilation. In addition, the joint locations (i.e. joint heatmaps) of the training data may be subjected to scaling and translation and a Gaussian noise addition to the x and y location of the joints.

Continuing with the specific example above for processing the raw data image shown in FIG. 2, the neural network engine 70 receives the following twenty inputs: the red map (FIG. 3A), the green map (FIG. 3B), the blue map (FIG. 3C), the coarse segmentation map (FIG. 4), and the joint heatmaps for the right shoulder (FIG. 5A), the right elbow (FIG. 5B), the right wrist (FIG. 5C), the left shoulder (FIG. 5D), the left elbow (FIG. 5E), the left wrist (FIG. 5F), the right hip (FIG. 5G), the right knee (FIG. 5H), the right ankle (figure SI), the left hip (FIG. 5J), the left knee (FIG. 5K), the left ankle (FIG. 5L), the right eye (FIG. 5M), the left eye (FIG. 5N), the left toe (FIG. 5P), and the right toe (FIG. 5Q).

In the present example, the neural network engine 70 generates a fine segmentation map as shown in FIG. 7. Similar to the coarse segmentation map generated by the pre-processing engine, the fine segmentation map includes a binary value for each pixel to indicate whether the pixel is part of the surface of the person. Accordingly, the fine segmentation map shows a similar shape as the person in the original image (FIG. 2) in the A-pose. Upon careful review of the curse segmentation map shown in FIG. 4 and the fine segmentation map shown in FIG. 7, it will be apparent that the fine segmentation map follows the edges of the person in the image more accurately. It is to be appreciated by a person of skill with the benefit of this description that the fine segmentation map may then be used to isolate the pixels of interest for creating front and back surfaces and stitching the front surface to the back surface by the mesh creator engine 75.

In the present example, the neural network engine 70 generates a fine segmentation map as shown in FIG. 7. Similar to the coarse segmentation map generated by the pre-processing engine, the fine segmentation map includes a binary value for each pixel to indicate whether the pixel is part of the surface of the person. Accordingly, the fine segmentation map shows a similar shape as the person in the original image (FIG. 2) in the A-pose. Upon careful review of the coarse segmentation map shown in FIG. 4 and the fine segmentation map shown in FIG. 7, it will be apparent that the fine segmentation map follows the edges of the person in the image more accurately. It is to be appreciated by a person of skill with the benefit of this description that the fine segmentation map may then be used to isolate the pixels of interest for creating front and back surfaces and stitching the front surface to the back surface by the mesh creator engine 75.

Figure 9A:
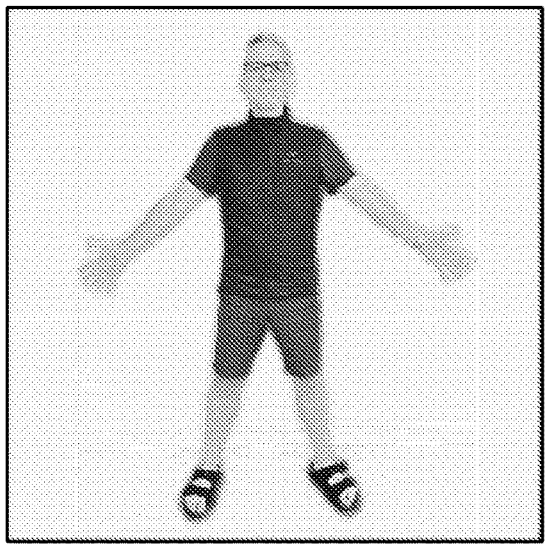
FIG. 9A is a map of the intensity of the red colors of the front surface as generated by the neural network engine.
Figure 9B:
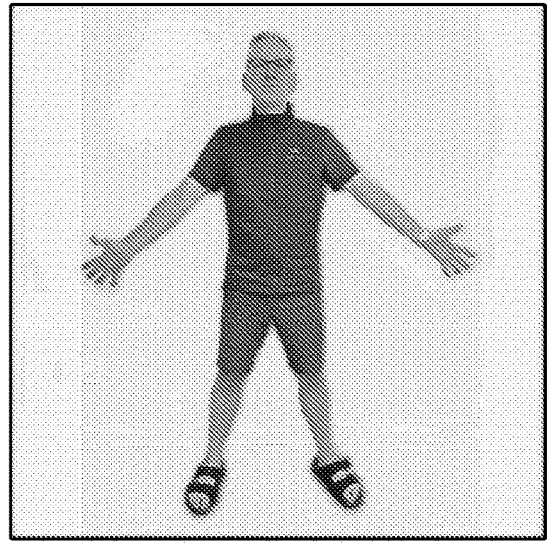
FIG. 9B is a map of the intensity of the green colors of the front surface as generated by the neural network engine.
Figure 9C:
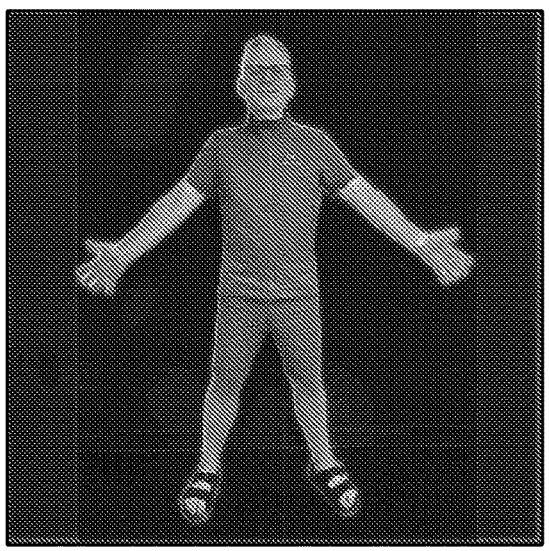
FIG. 9C is a map of the intensity of the blue colors of the front surface as generated by the neural network engine.
Figure 10A:
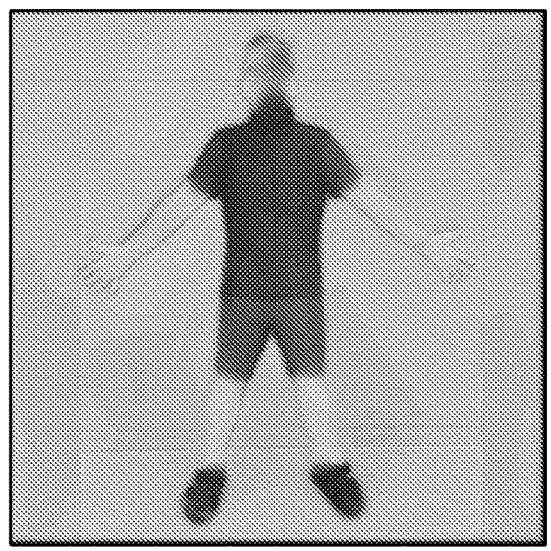
FIG. 10A is a map of the intensity of the red colors of the back surface as generated by the neural network engine.
Figure 10B:
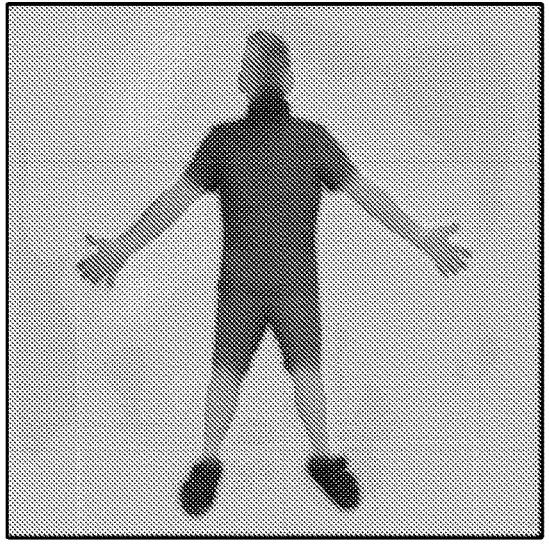
FIG. 10B is a map of the intensity of the green colors of the back surface as generated by the neural network engine.
Figure 10C:
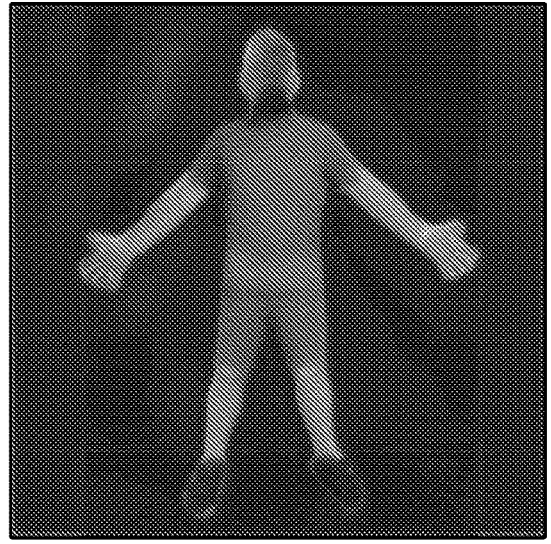
FIG. 10C is a map of the intensity of the blue colors of the back surface as generated by the neural network engine.

Continuing with this present example, the neural network engine 70 further generates color information for the front and back surfaces. In particular, the neural network engine generates a front red map (FIG. 9A), a front green map (FIG. 9B), a blue map (FIG. 9C), a back red map (FIG. 10A), a back green map (FIG. 10B), a back blue map (FIG. 10C). Similar to the other color maps described above, the color maps generated by the neural network engine 70 may also be normalized to a value between 0 and 1. In the present example, the neural network engine 70 may also process the original color maps to remove light and shadow data such that the two-dimensional color maps generated do not include any shadows or additional source lighting that may have been in the original raw data file.

Figure 11A:
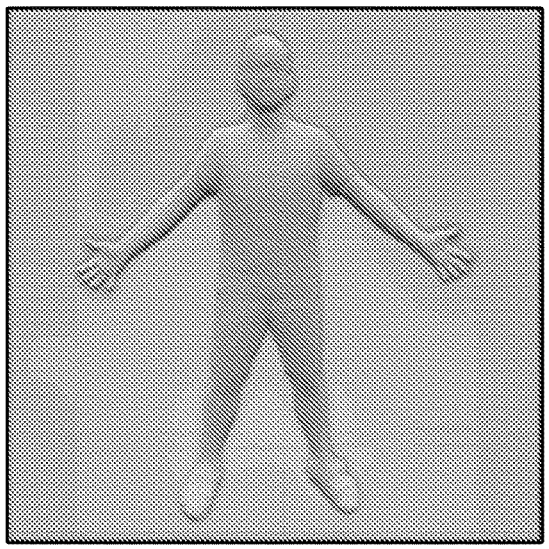
FIG. 11A is a map of the first normal values of the front surface as generated by the neural network engine.
Figure 11B:
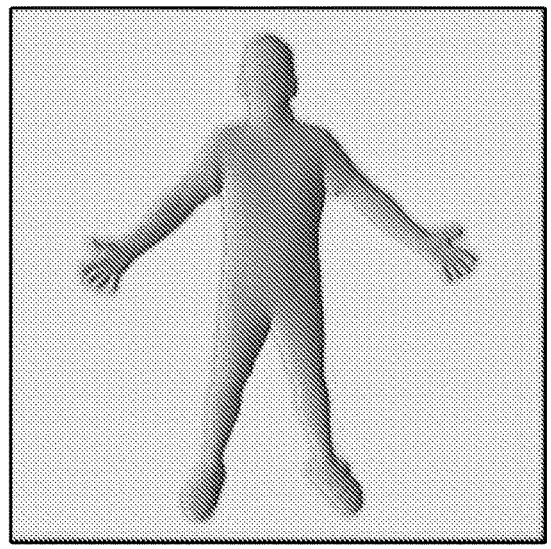
FIG. 11B is a map of the second normal values of the front surface as generated by the neural network engine.
Figure 12A:
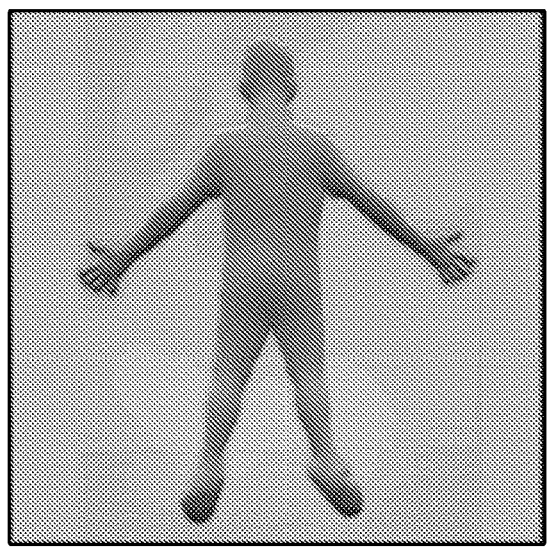
FIG. 12A is a map of the first normal values of the back surface as generated by the neural network engine.
Figure 12B:
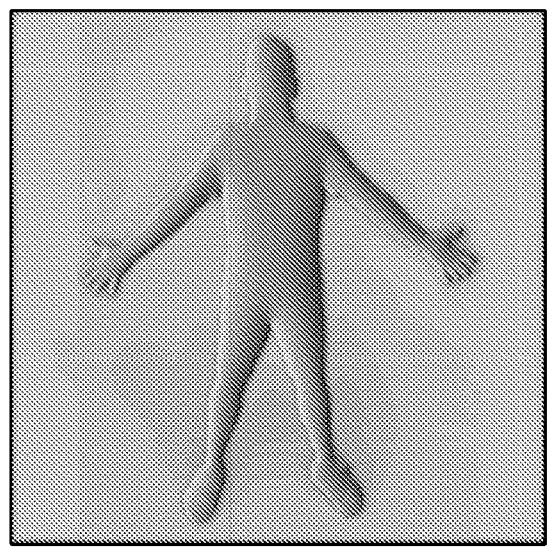
FIG. 12B is a map of the second normal values of the back surface as generated by the neural network engine.

Furthermore, the neural network engine 70 may generate additional optional maps for further improvements in the accuracy of the two-dimensional maps used by the mesh creator engine 75. In addition, additional two-dimensional maps may also assist with further training of the neural network engine 70. As an example, the neural network engine 70 may generate two-dimensional maps to describe the surface normal of the front surface and the back surface for this purpose. It is to be appreciated by a person of skill with the benefit of this description that with the constraints of the surface position and the normalization of the normal vector to the surface, only two values are used to describe the surface normal as the third value may be generated from the other two values with the constraints described above. Accordingly, the neural network engine 70 may generate a first front normal map (FIG. 11A), a second front normal map (FIG. 11B), a first back normal map (FIG. 12A), and a second back normal map (FIG. 12B).

The mesh creator engine 75 is to generate a three-dimensional mesh based on the plurality of two-dimensional maps generated by the neural network engine 70. The manner by which the mesh creator engine 75 generated the three-dimensional mesh is not particularly limited and is dependent on the output of the neural network engine 70.

Figure 13A:
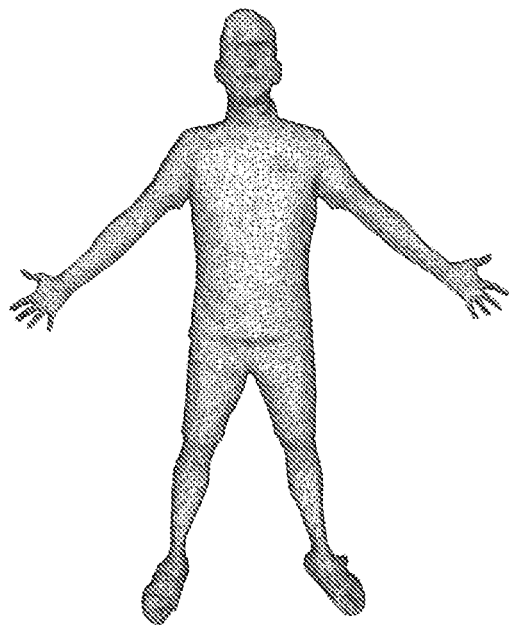
FIG. 13A is a front view of a three-dimensional mesh stitched together.
Figure 13B:
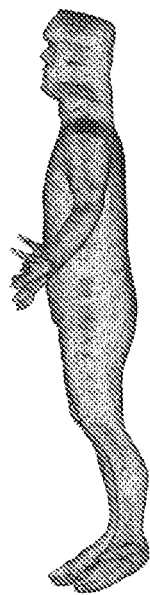
FIG. 13B is a side view of a three-dimensional mesh stitched together.
Figure 13C:
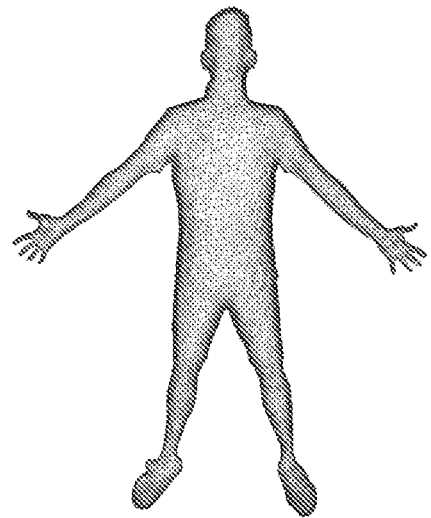
FIG. 13C is a back view of a three-dimensional mesh stitched together.

In the present example, the mesh creator engine 75 uses the fine segmentation map (FIG. 7) to isolate the pixels or points that form part of the object and discard or disregard all pixels outside of the segmentation area. The front surface of the mesh closest to the camera is then formed using the distance map (FIG. 8A) and the back surface of the mesh is formed using the thickness map (FIG. 8B) with reference to the front surface of the mesh. It is to be appreciated by a person of skill with the benefit of this description that the mesh creator engine 75 may use the boundary of the segmentation area to create more triangles in the mesh for connecting the front surface to the back surface. Accordingly, an outline of the three-dimensional mesh formed from the distance map and the thickness map is shown from the front view (FIG. 13A), side view (FIG. 13B), and the back view (FIG. 13C).

Figure 14:
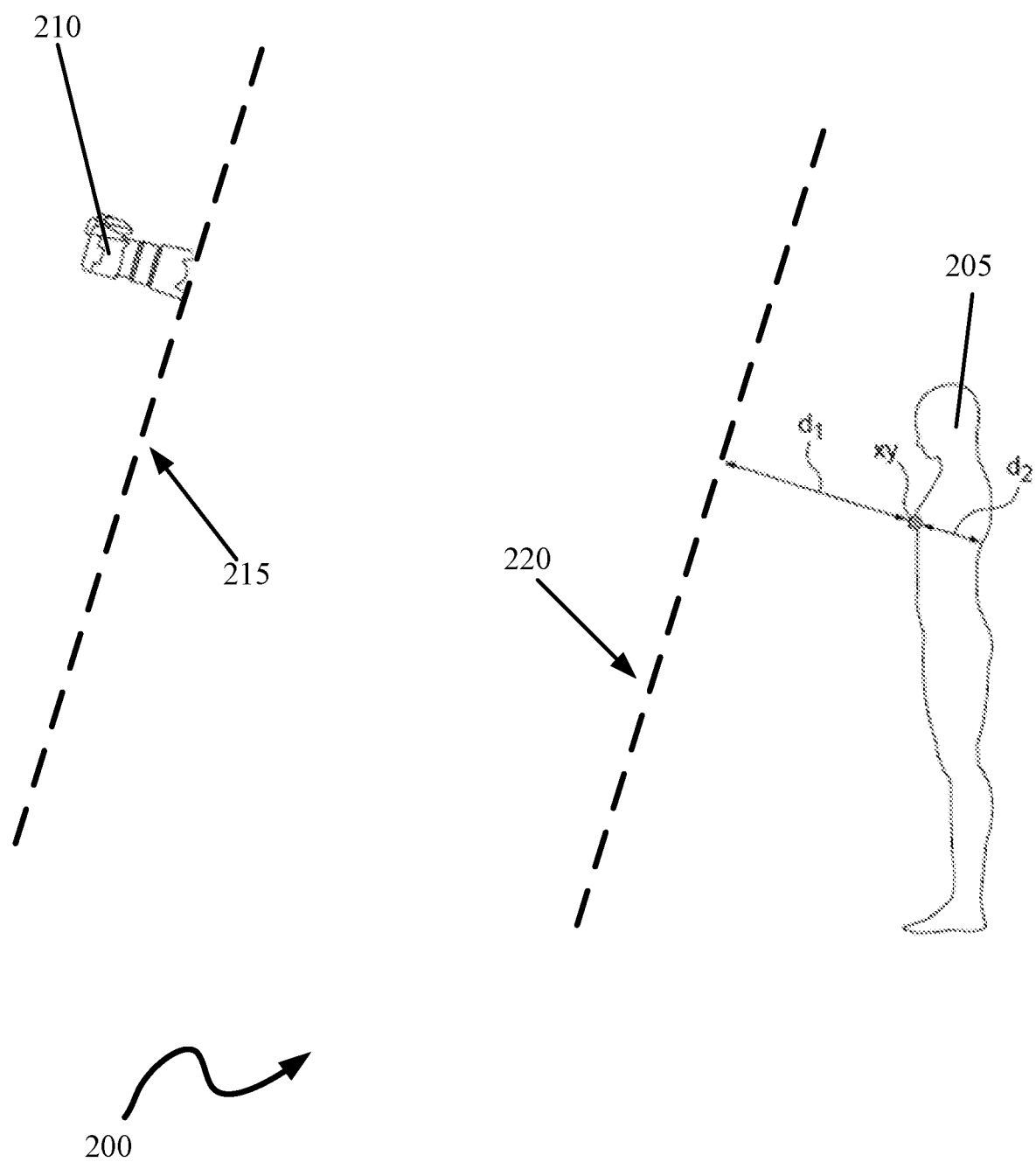
FIG. 14 is a schematic representation of a system to illustrate distance and thickness measurements.

Referring to FIG. 14, a schematic representation of a system 200 illustrating the measurements used to generate the three-dimensional mesh is shown. In the present example, the system 200 includes a camera 210 at a position on the camera plane 215 to capture an image of the object 205. As described in the above example, after applying the neural network engine 70, the distance map provides the distance d1 to pixel (x,y) from the reference plane 220. The thickness map then provides the distance d2 to the corresponding point on the back surface of the three-dimensional mesh.

Figure 15A:
FIG. 15A is a front view of a three-dimensional mesh stitched together with added color based on the two-dimensional maps of FIGS. 9A-C and 10A-C.
Figure 15B:
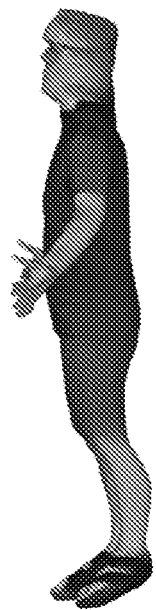
FIG. 15B is a side view of the mesh shown in FIG. 15A.
Figure 15C:
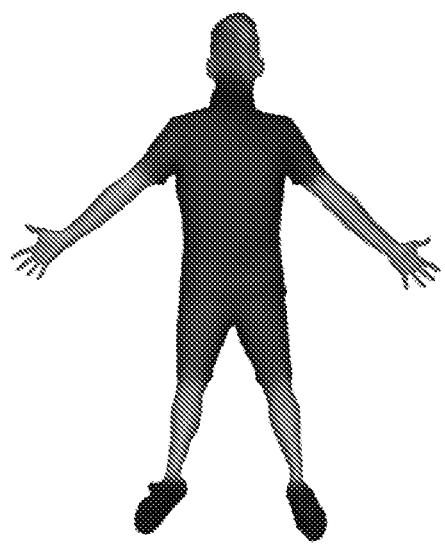
FIG. 15C is a back view of the mesh shown in FIG. 15A.

The mesh creator engine 75 subsequently uses the front red map (FIG. 9A), the front green map (FIG. 9B), the blue map (FIG. 9C), the back red map (FIG. 10A), the back green map (FIG. 10B), and the back blue map (FIG. 10C) to add color to the mesh to generate the three-dimensional mesh shown (in grayscale) from the front view (FIG. 15A), side view (FIG. 15B), and the back view (FIG. 15C).

Figure 16:
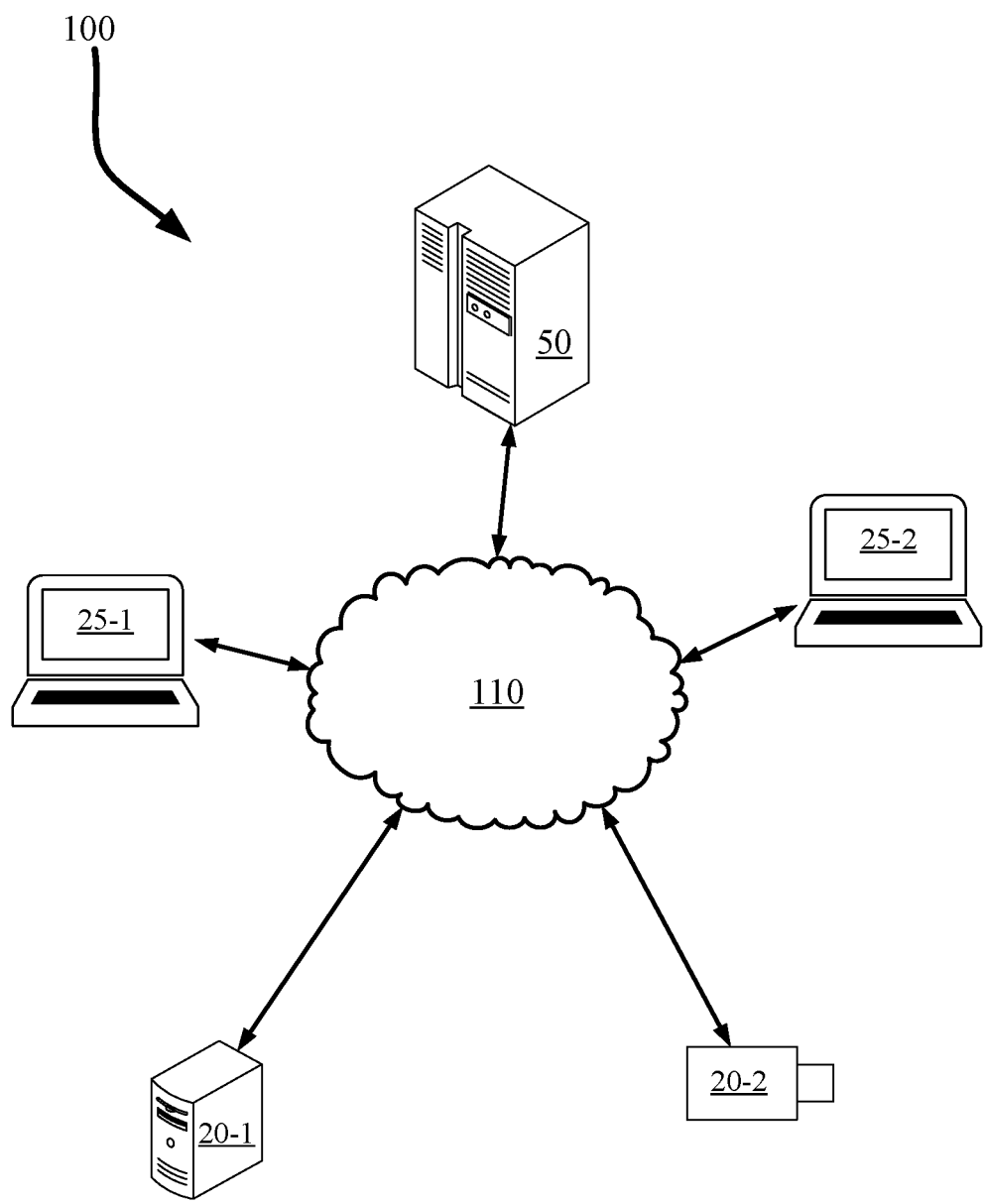
FIG. 16 is a schematic representation of a system to provide access to the apparatus to generate a three-dimensional mesh based on a single two-dimensional image.

Referring to FIG. 16, a schematic representation of a computer network system is shown generally at 100. It is to be understood that the system 100 is purely exemplary and it will be apparent to those skilled in the art that a variety of computer network systems are contemplated. The system 100 includes the apparatus 50 to generate a three-dimensional mesh, a plurality of external sources 20-1 and 20-2 (generically, these external sources are referred to herein as "external source 20" and collectively they are referred to as "external sources 20"), and a plurality of content requesters 25-1 and 25-2 (generically, these content requesters are referred to herein as "content requesters 25" and collectively they are referred to as "content requesters 25") connected by a network 110. The network 110 is not particularly limited and can include any type of network such as the Internet, an intranet or a local area network, a mobile network, or a combination of any of these types of networks. In some embodiments, the network 110 may also include a peer to peer network.

In the present embodiment, the external sources 20 may be any type of computing device used to communicate with the apparatus 50 over the network 110 for providing raw data such as an image of a person. For example, the external source 20-1 may be a personal computer. It is to be appreciated by a person of skill with the benefit of this description that a personal computer may be substituted with a laptop computer, a portable electronic device, a gaming device, a mobile computing device, a portable computing device, a tablet computing device, a cell phone, and a smart phone or the like. In some examples, the external source 20-2 may be a camera to capture an image. The raw data may be generated from an image or video received or captured at the external source 20. In other examples, it is to be appreciated that the external source 20 may be a personal computer, on which content may be created such that the raw data is generated automatically from the content. The content requesters 25 may also be any type of computing device used to communicate with the apparatus 50 over the network 110 for receiving three-dimensional meshes to subsequently animate. For example, content requesters 25 may be a computer animator searching for a new avatar to animate in a program.

Figure 17:
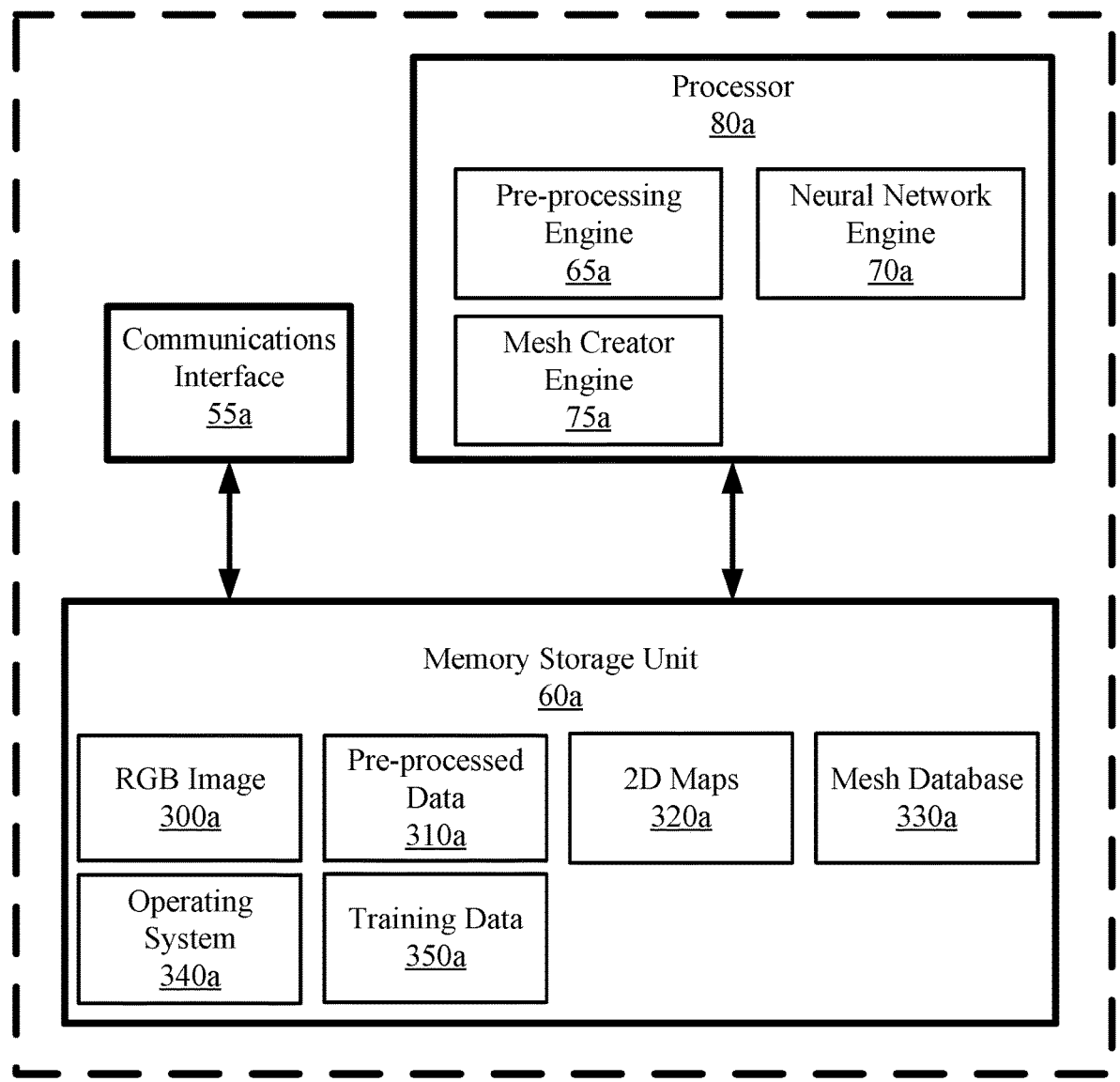
FIG. 17 is a schematic representation of the components of another example apparatus to generate a three-dimensional mesh based on a single two-dimensional image.

Referring to FIG. 17, another schematic representation of an apparatus 50a generate a three-dimensional mesh based on a single two-dimensional image is generally shown. Like components of the apparatus 50a bear like reference to their counterparts in the apparatus 50, except followed by the suffix "a". In the present example, the apparatus 50a includes a communications interface 55a, a memory storage unit 60a, and a processor 80a. In the present example, the processor 80a includes a pre-processing engine 65a, a neural network engine 70a, and a mesh creator engine 75a.

In the present example, the memory storage unit 60a may also maintain databases to store various data used by the apparatus 50a. For example, the memory storage unit 60a may include a database 300a to store raw data images in the RGB image format, a database 310a to store the data generated by the pre-processing engine 65a, a database 320a to store the two-dimensional maps generated by the neural network engine 70a, and a database 330a to store the three-dimensional meshes generated by the mesh creator engine 75a. In addition, the memory storage unit may include an operating system 340a that is executable by the processor 80a to provide general functionality to the apparatus 50a. Furthermore, the memory storage unit 60a may be encoded with codes to direct the processor 80a to carry out specific steps to perform a method described in more detail below. The memory storage unit 60a may also store instructions to carry out operations at the driver level as well as other hardware drivers to communicate with other components and peripheral devices of the apparatus 50a, such as various user interfaces to receive input or provide output.

The memory storage unit 60a may also include a synthetic training database 350a to store training data for training the neural network engine 70a. It is to be appreciated that although the present example stores the training data locally, other examples may store the training data externally, such as in a file server or cloud which may be accessed during the training of the neural network via the communications interface 55a.

Figure 18:
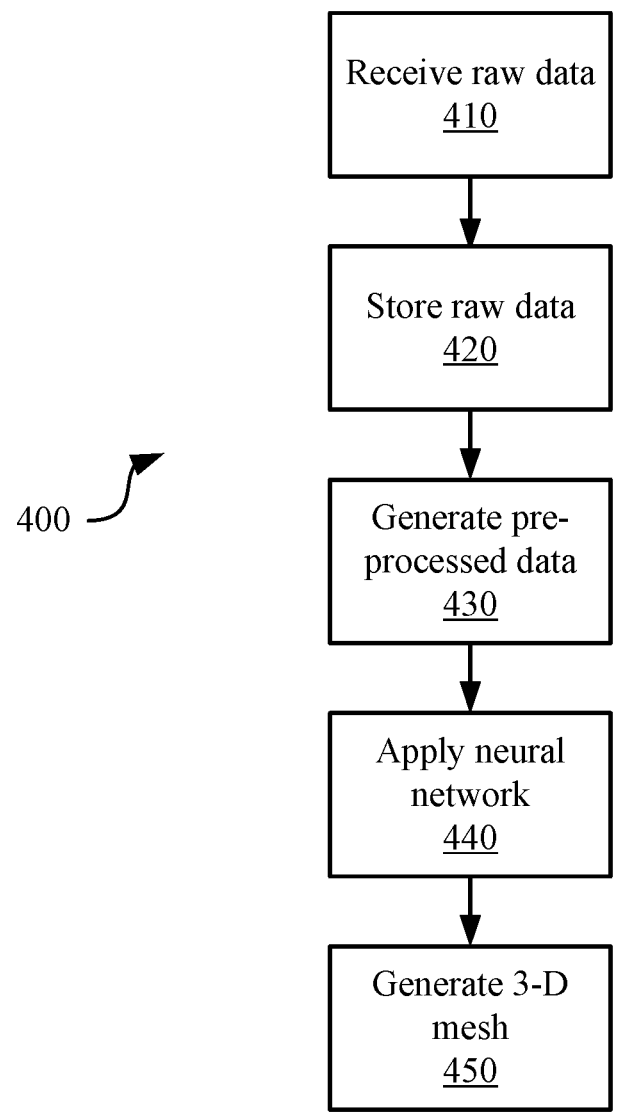
FIG. 18 is a flowchart of an example of a method of generating a three-dimensional mesh based on a single two-dimensional image.

Referring to FIG. 18, a flowchart of an example method of generating a three-dimensional mesh based on a single two-dimensional image is generally shown at 400. In order to assist in the explanation of method 400, it will be assumed that method 400 may be performed by the apparatus 50. Indeed, the method 400 may be one way in which the apparatus 50 may be configured. Furthermore, the following discussion of method 400 may lead to a further understanding of the apparatus 50 and it components. In addition, it is to be emphasized, that method 400 may not be performed in the exact sequence as shown, and various blocks may be performed in parallel rather than in sequence, or in a different sequence altogether.

Beginning at block 410, the apparatus 50 receives raw data from an external source via the communications interface 55. In the present example, the raw data includes a representation of a person. In particular, the raw data is a two-dimensional image of the person. The manner by which the person is represented and the exact format of the two-dimensional image is not particularly limited. In the present example, the two-dimensional image is received in an RGB format. In other examples, the two-dimensional image be in a different format, such as a raster graphic file or a compressed image file captured and processed by a camera. Once received at the apparatus 50, the raw data is to be stored in the memory storage unit 60 at block 420.

Block 430 involves generating pre-processed data with the pre-processing engine 65. In the present example, the pre-processed data includes a coarse segmentation map and a joint heatmap. The coarse segmentation map is to generally provide an outline of the person such that pixels outside of the segmentation may be ignored for analysis purposes. The joint heatmap is to generally provide representation of the location of a point on the person. In the present example, the point of interest on the person is a joint which may correspond to a location where the person carries out relative motions between portions of the body, such as a shoulder where the arm may move relative to a torso.

Next, block 440 comprises the neural network engine 70 applying a neural network to the raw data, the coarse segmentation map, and the joint heatmap to generate a plurality of two-dimensional maps, such as those described in detail above. The two-dimensional maps generated by the neural network engine 70 may then be used to generate a three-dimensional mesh at block 450.

In the present example, block 450 generates the points three-dimensional front and back meshes from distance and thickness maps. The X and Y coordinates of each point in each mesh may be defined by the coordinates of each pixel of a map. The Z coordinate of each point of the front mesh may be defined by the value of each pixel of the distance map. The Z coordinate of each point of the back mesh may be defined by the value of each pixel of the distance map added to the value of each corresponding pixel in the thickness map. It is to be understood that the aforementioned mesh creation method is purely exemplary, and it will be apparent to those skilled in the art that other methods to create three-dimensional meshes from maps describing depth and thickness may be considered.

Various advantages will not become apparent to a person of skill in the art. In particular, the apparatus 50 or the apparatus 50a may be used to create a three-dimensional mesh from a two-dimensional image of an object in a single simple process. The three-dimensional mesh may subsequently be used for computer animation. As another example, the three-dimensional mesh generated by the apparatus 50 or the apparatus 50a may also be used as an input for more complicated neural networks to obtain more refined surface features.

It should be recognized that features and aspects of the various examples provided above may be combined into further examples that also fall within the scope of the present disclosure.

What is claimed is:

1. An apparatus comprising:
 a communications interface at which to receive a two-dimensional image from an external source accessible via a network,
 wherein the two-dimensional image includes a representation of a person;
 a memory storage unit in which to store the two-dimensional image;
 a pre-processing engine that is configured to generate, based on the two-dimensional image,
 (i) coarse segmentation map that is representative of an outline of the person, and (ii) a plurality of joint heatmaps, each of which provides a representation of a corresponding one of a plurality of joints of the person;
a neural network engine that is configured to:
receive the two-dimensional image, the coarse segmentation map, and the plurality of joint heatmaps as inputs, and
generate a plurality of two-dimensional maps by applying a convolutional neural network to the inputs, wherein the plurality of two-dimensional maps includes
(i) a first front map of a front normal surface of the person,
(ii) a second front map based on the front normal surface of the person,
(iii) a first back map of a back normal surface of the person, and
(iv) a second back map based on the back normal surface of the person; and
a mesh creator engine that is configured to generate a three-dimensional mesh based on the plurality of two-dimensional maps;
wherein the neural network engine is to be further trained using at least one of the first front map, the second front map, the first back map, or the second back map.

2. The apparatus of claim 1, wherein the two-dimensional image is an RGB image.

3. The apparatus of claim 1, wherein the plurality of joint heatmaps includes a separate heatmap for each of a left eye, a right eye, a left shoulder, a right shoulder, a left elbow, a right elbow, a left wrist, a right wrist, a left hip, a right hip, a left knee, a right knee, a left ankle, a right ankle, a left toe, and a right toe.

4. The apparatus of claim 1, wherein the neural network engine is to use a fully convolutional network.

5. The apparatus of claim 4, wherein the fully convolutional network comprises two stacked U-nets with intermediate supervision.

6. The apparatus of claim 1, wherein the plurality of two-dimensional maps further includes a fine segmentation map, a distance map, a thickness map, a front red map, a front green map, a front blue map, a back red map, a back green map, and a back blue map.

7. The apparatus of claim 6, wherein the distance map comprises a distance between a reference plane and the front normal surface.

8. The apparatus of claim 7, wherein the reference plane is between a camera plane and the person.

9. The apparatus of claim 6, wherein the neural network engine is to remove lighting and shadow data from the two-dimensional image.

10. The apparatus of claim 6, wherein the mesh creator engine generates the three-dimensional mesh within the fine segmentation map and discards pixels outside of a segmentation.

11. A method comprising:
receiving raw data from an external source via a communications interface, wherein the raw data includes a representation of a person;
storing the raw data in a memory storage unit;
generating, based on the raw data,
(i) a coarse segmentation map that represents an outline of the person, and
(ii) a joint heatmap that represents a joint on the person;
applying a neural network to the raw data, the coarse segmentation map, and the joint heatmap to generate a plurality of two-dimensional maps that describe a front normal surface of the person and a back normal surface of the person; and
generating a three-dimensional mesh based on the plurality of two-dimensional maps.

12. The method of claim 11, wherein receiving the raw data comprises receiving a two-dimensional image.

13. The method of claim 12, wherein receiving the two-dimensional image comprises receiving an RGB image.

14. The method of claim 11, further comprising generating a plurality of joint heatmaps, wherein the plurality of joint heatmaps are used by the neural network to generate the plurality of two-dimensional maps, and wherein the plurality of joint heatmaps includes the joint heatmap.

15. The method of claim 11, wherein applying the neural network comprises applying a fully convolutional network.

16. The method of claim 11, wherein generating the plurality of two-dimensional maps comprises generate a distance map, the distance map including a distance between a reference plane and the front normal surface.

17. The method of claim 16, further comprising setting the reference plane between a camera plane and the person.

18. The method of claim 11, further comprising removing lighting and shadow data from the raw data with the neural network.

19. A non-transitory computer readable medium encoded with codes, wherein the codes are to direct a processor to:
receive, from an external source via a communications interface, an RGB image that includes a representation of a person;
store the RGB image in a memory storage unit;
generate, based on the RGB image,
(i) a coarse segmentation map that represents an outline of the person,
(ii) a joint heatmap that represents a joint on the person, and
(iii) a plurality of intensity maps that represent intensity of red, green, and blue in the RGB image;
apply a neural network to the RGB image, the coarse segmentation map, the joint heatmap, and the plurality of intensity maps to generate a plurality of two-dimensional maps,
wherein the plurality of two-dimensional maps includes (i) maps that represent red, green, and blue across a front normal surface of the person and (ii) maps that represent red, green, and blue across a back normal surface of the person; and
generate a three-dimensional mesh based on the plurality of two-dimensional maps.

20. The non-transitory computer readable medium of claim 19, wherein the codes are to direct the processor to generate a plurality of joint heatmaps, wherein the plurality of joint heatmaps are used by the neural network to generate the plurality of two-dimensional maps, and wherein the plurality of joint heatmaps includes the joint heatmap.

21. The non-transitory computer readable medium of claim 19, wherein the neural network to be applied is a fully convolutional neural network.

22. The non-transitory computer readable medium of claim 19, wherein the codes are to direct the processor to generate a distance map as one of the plurality of two-dimensional maps, the distance map including a distance between a reference plane and the front normal surface.

23. The non-transitory computer readable medium of claim 22, wherein the codes are to direct the processor to set the reference plane with the neural network, the reference plane to be set between a camera plane and the person.

24. The non-transitory computer readable medium of claim 19, wherein the codes are to direct the processor to remove lighting and shadow data from the RGB image with the neural network.

* * * * *